(12) United States Patent
Coughlin et al.

(10) Patent No.: US 7,754,810 B2
(45) Date of Patent: Jul. 13, 2010

(54) PROCESS FOR PRODUCING FLUOROPOLYMERS

(76) Inventors: Michael Cregg Coughlin, 1401 Trevalley Rd., Wilmington, DE (US) 19810; Ming-Hong Hung, 601 Andover Rd., Wilmington, DE (US) 19803; Phan Linh Tang, 133 Sidesaddle Pl., West Chester, PA (US) 19382

( * ) Notice: Subject to any disclaimer, the term of this patent is extended or adjusted under 35 U.S.C. 154(b) by 106 days.

(21) Appl. No.: 12/255,082

(22) Filed: Oct. 21, 2008

(65) Prior Publication Data

US 2009/0124754 A1    May 14, 2009

Related U.S. Application Data

(60) Provisional application No. 61/002,588, filed on Nov. 9, 2007.

(51) Int. Cl.
*C08K 5/01* (2006.01)

(52) U.S. Cl. ..................... 524/746; 524/805

(58) Field of Classification Search ............... 524/746, 524/805
See application file for complete search history.

(56) References Cited

U.S. PATENT DOCUMENTS

| 4,214,060 A | 7/1980 | Apotheker |
| 4,281,092 A | 7/1981 | Breazeale |
| 4,380,618 A | 4/1983 | Khan et al. |
| 4,524,197 A | 6/1985 | Khan |
| 5,285,002 A | 2/1994 | Grootaert |
| 5,639,837 A | 6/1997 | Farnham et al. |
| 5,789,508 A | 8/1998 | Baker et al. |
| 6,395,848 B1 | 5/2002 | Morgan et al. |
| 6,429,258 B1 | 8/2002 | Morgan et al. |
| 6,774,764 B2 | 8/2004 | Ghosh et al. |
| 7,094,839 B2 | 8/2006 | Grootaert et al. |

FOREIGN PATENT DOCUMENTS

WO    WO 2005/121290 A1    12/2005

*Primary Examiner*—Edward J Cain

(57) ABSTRACT

An emulsion polymerization process for the production of fluoropolymers is disclosed wherein a combination of at least two fluorosurfactants is employed as dispersants. At least one fluorosurfactant is a perfluoroalkyl or perfluoroalkoxy sulfinate. At least one other fluorosurfactant is a perfluoropolyether having at least one endgroup selected from the group consisting of carboxylic acid, a slat thereof, sulfonic acid and a salt thereof.

16 Claims, No Drawings

PROCESS FOR PRODUCING FLUOROPOLYMERS

CROSS-REFERENCE TO RELATED APPLICATIONS

This application claims the benefit of U.S. Provisional Application No. 61/002,588, filed Nov. 9, 2007.

FIELD OF THE INVENTION

This invention pertains to an emulsion polymerization process for the production of fluoropolymers wherein at least two fluorosurfactants are employed: 1) a perfluoroaliphatic sulfinate and 2) a perfluoropolyether having at least one endgroup selected from the group consisting of carboxylic acid, sulfonic acid, carboxylic acid salt and sulfonic acid salt.

BACKGROUND OF THE INVENTION

Production of fluoropolymers, both thermoplastic and elastomeric, by emulsion and solution polymerization methods is well known in the art; see for example U.S. Pat. Nos. 4,214,060; 4,281,092; 4,380,618; 4,524,197; 5,789,508; 6,774,764 B2. Generally, fluoropolymers are produced in an emulsion polymerization process wherein a water-soluble polymerization initiator and a relatively large amount of surfactant are employed.

Morgan et al. (U.S. Pat. No. 6,395,848 B1) disclose an aqueous dispersion process utilizing a combination of at least two fluorosurfactants. At least one surfactant is a perfluoropolyether (PFPE) carboxylic acid, sulfonic acid or the salt thereof and at least one surfactant is a fluoroalkyl carboxylic acid, sulfonic acid or the salt thereof, or a fluoroalkoxy aryl sulfonic acid or salt thereof. Some fluoropolymers made by this process may be difficult to isolate from the resulting dispersion.

SUMMARY OF THE INVENTION

One aspect of the present invention provides an emulsion polymerization process for the production of fluoropolymers wherein the resulting fluoropolymers are readily isolated from solution. This process comprises polymerizing at least one fluoromonomer in an aqueous medium comprising initiator and dispersing agent to obtain an aqueous dispersion of fluoropolymer, wherein said dispersing agent is a combination of at least two fluorosurfactants, at least one of said fluorosurfactants is a perfluoroaliphatic sulfinate, and at least one of said fluorosurfactants is a perfluoropolyether having at least one endgroup selected from the group consisting of carboxylic acid, carboxylic acid salt, sulfonic acid and sulfonic acid salt.

DETAILED DESCRIPTION OF THE INVENTION

The present invention is directed to an emulsion polymerization process for producing a fluoropolymer, said fluoropolymer being either a thermoplastic fluoropolymer or a fluoroelastomer. By "thermoplastic fluoropolymer" is meant a crystalline or semi-crystalline fluoropolymer. By "fluoroelastomer" is meant an amorphous elastomeric fluoropolymer. The fluoropolymer may be partially fluorinated or perfluorinated.

Fluoropolymers made by the process of this invention comprise copolymerized units of at least one fluoromonomer. By "fluoromonomer" is meant a polymerizable monomer containing at least 35 weight percent (wt. %) fluorine. Such monomers include, but are not limited to fluorine-containing olefins and fluorine-containing vinyl ethers.

Thermoplastic fluoropolymers produced by this invention may be homopolymers (e.g. polytetrafluoroethylene or polyvinylidene fluoride) or copolymers containing up to 20 wt. % of a second (different) fluoromonomer, a hydrocarbon olefin or a combination of the latter. Such copolymers include, but are not limited to THV, FEP and PFA.

Fluoroelastomers made by the process of this invention contain between 25 to 70 weight percent, based on the weight of the fluoroelastomer, of copolymerized units of a first fluoromonomer which may be vinylidene fluoride ($VF_2$) or tetrafluoroethylene (TFE). The remaining units in the fluoroelastomers are comprised of one or more additional copolymerized monomers, different from said first monomer, selected from the group consisting of fluoromonomers, hydrocarbon olefins and mixtures thereof.

According to the present invention, fluorine-containing olefins include, but are not limited to vinylidene fluoride ($VF_2$), hexafluoropropylene (HFP), tetrafluoroethylene (TFE), 1,2,3,3,3-pentafluoropropene (1-HPFP), 1,1,3,3,3-pentafluoropropene (2-HPFP), chlorotrifluoroethylene (CTFE) and vinyl fluoride.

The fluorine-containing vinyl ethers employed in the present invention include, but are not limited to perfluoro(alkyl vinyl)ethers. Perfluoro(alkyl vinyl)ethers (PAVE) suitable for use as monomers include those of the formula

where $R_f$ and $R_{f'}$ are different linear or branched perfluoroalkylene groups of 2-6 carbon atoms, m and n are independently 0-10, and $R_{f''}$ is a perfluoroalkyl group of 1-6 carbon atoms.

A preferred class of perfluoro(alkyl vinyl)ethers includes compositions of the formula

where X is F or $CF_3$, n is 0-5, and $R_f$ is a perfluoroalkyl group of 1-6 carbon atoms.

A most preferred class of perfluoro(alkyl vinyl)ethers includes those ethers wherein n is 0 or 1 and $R_f$ contains 1-3 carbon atoms. Examples of such perfluorinated ethers include perfluoro(methyl vinyl)ether (PMVE) and perfluoro(propyl vinyl)ether (PPVE). Other useful monomers include compounds of the formula

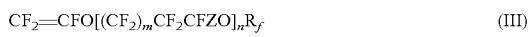

where $R_f$ is a perfluoroalkyl group having 1-6 carbon atoms, m=0 or 1, n=0-5, and Z=F or $CF_3$. Preferred members of this class are those in which $R_f$ is $C_3F_7$, m=0, and n=1.

Additional perfluoro(alkyl vinyl)ether monomers include compounds of the formula

where m and n independently=0-10, p=0-3, and x=1-5. Preferred members of this class include compounds where n=0-1, m=0-1, and x=1.

Other examples of useful perfluoro(alkyl vinyl ethers) include

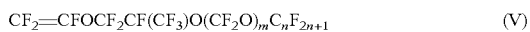

where n=1-5, m=1-3, and where, preferably, n=1.

If copolymerized units of PAVE are present in fluoroelastomers prepared by the process of the invention, the PAVE content generally ranges from 25 to 75 weight percent, based on the total weight of the fluoroelastomer. If perfluoro(methyl vinyl)ether is used, then the fluoroelastomer preferably contains between 30 and 60 wt. % copolymerized PMVE units.

Hydrocarbon olefins useful in the fluoropolymers prepared by the process of this invention include, but are not limited to ethylene and propylene. If copolymerized units of a hydrocarbon olefin are present in the fluoroelastomers prepared by the process of this invention, hydrocarbon olefin content is generally 4 to 30 weight percent.

The fluoroelastomers prepared by the process of the present invention may also, optionally, comprise units of one or more cure site monomers. Examples of suitable cure site monomers include, but are not limited to: i) bromine-containing olefins; ii) iodine-containing olefins; iii) bromine-containing vinyl ethers; iv) iodine-containing vinyl ethers; v) fluorine-containing olefins having a nitrile group; vi) fluorine-containing vinyl ethers having a nitrile group; vii) 1,1,3,3,3-pentafluoropropene (2-HPFP); viii) perfluoro(2-phenoxypropyl vinyl)ether; and ix) non-conjugated dienes.

Brominated cure site monomers may contain other halogens, preferably fluorine. Examples of brominated olefin cure site monomers are $CF_2$=$CFOCF_2CF_2CF_2OCF_2CF_2Br$; bromotrifluoroethylene; 4-bromo-3,3,4,4-tetrafluorobutene-1 (BTFB); and others such as vinyl bromide, 1-bromo-2,2-difluoroethylene; perfluoroallyl bromide; 4-bromo-1,1,2-trifluorobutene-1; 4-bromo-1,1,3,3,4,4,-hexafluorobutene; 4-bromo-3-chloro-1,1,3,4,4-pentafluorobutene; 6-bromo-5,5,6,6-tetrafluorohexene; 4-bromoperfluorobutene-1 and 3,3-difluoroallyl bromide. Brominated vinyl ether cure site monomers useful in the invention include 2-bromo-perfluoroethyl perfluorovinyl ether and fluorinated compounds of the class $CF_2Br$—$R_f$—O—$CF$=$CF_2$ ($R_f$ is a perfluoroalkylene group), such as $CF_2BrCF_2O$—$CF$=$CF_2$, and fluorovinyl ethers of the class $ROCF$=$CFBr$ or $ROCBr$=$CF_2$ (where R is a lower alkyl group or fluoroalkyl group) such as $CH_3OCF$=$CFBr$ or $CF_3CH_2OCF$=$CFBr$.

Suitable iodinated cure site monomers include iodinated olefins of the formula: $CHR$=$CH$-$Z$-$CH_2CHR$—I, wherein R is —H or —$CH_3$; Z is a $C_1$-$C_{18}$ (per)fluoroalkylene radical, linear or branched, optionally containing one or more ether oxygen atoms, or a (per)fluoropolyoxyalkylene radical as disclosed in U.S. Pat. No. 5,674,959. Other examples of useful iodinated cure site monomers are unsaturated ethers of the formula: $I(CH_2CF_2CF_2)_nOCF$=$CF_2$ and $ICH_2CF_2O[CF(CF_3)CF_2O]_nCF$=$CF_2$, and the like, wherein n=1-3, such as disclosed in U.S. Pat. No. 5,717,036. In addition, suitable iodinated cure site monomers including iodoethylene, 4-iodo-3,3,4,4-tetrafluorobutene-1 (ITFB); 3-chloro-4-iodo-3,4,4-trifluorobutene; 2-iodo-1,1,2,2-tetrafluoro-1-(vinyloxy)ethane; 2-iodo-1-(perfluorovinyloxy)-1,1,-2,2-tetrafluoroethylene; 1,1,2,3,3,3-hexafluoro-2-iodo-1-(perfluorovinyloxy)propane; 2-iodoethyl vinyl ether; 3,3,4,5,5,5-hexafluoro-4-iodopentene; and iodotrifluoroethylene are disclosed in U.S. Pat. No. 4,694,045. Allyl iodide and 2-iodoperfluoroethyl perfluorovinyl ether are also useful cure site monomers.

Useful nitrile-containing cure site monomers include those of the formulas shown below.

$$CF_2=CF-O(CF_2)_n-CN \qquad (VI)$$

where n=2-12, preferably 2-6;

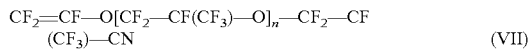

where n=0-4, preferably 0-2;

$$CF_2=CF-[OCF_2CF(CF_3)]_x-O-(CF_2)_n-CN \qquad (VIII)$$

where x=1-2, u and n=1-4; and $$CF_2=CF-O-(CF_2)_n-O-CF(CF_3)CN \qquad (IX)$$

where n=2-4. Those of formula (VIII) are preferred. Especially preferred cure site monomers are perfluorinated polyethers having a nitrile group and a trifluorovinyl ether group. A most preferred cure site monomer is $$CF_2=CFOCF_2CF(CF_3)OCF_2CF_2CN \qquad (X)$$

i.e. perfluoro(8-cyano-5-methyl-3,6-dioxa-1-octene) or 8-CNVE.

Examples of non-conjugated diene cure site monomers include, but are not limited to 1,4-pentadiene; 1,5-hexadiene; 1,7-octadiene; 3,3,4,4-tetrafluoro-1,5-hexadiene; and others, such as those disclosed in Canadian Patent 2,067,891 and European Patent 0784064A1. A suitable triene is 8-methyl-4-ethylidene-1,7-octadiene.

Of the cure site monomers listed above, preferred compounds, for situations wherein the fluoroelastomer will be cured with peroxide, include 4-bromo-3,3,4,4-tetrafluorobutene-1 (BTFB); 4-iodo-3,3,4,4-tetrafluorobutene-1 (ITFB); allyl iodide; bromotrifluoroethylene and a nitrile-containing cure site monomer such as 8-CNVE. When the fluoroelastomer will be cured with a polyol, 2-HPFP or perfluoro(2-phenoxypropyl vinyl)ether is the preferred cure site monomer. When the fluoroelastomer will be cured with a tetraamine, bis(aminophenol) or bis(thioaminophenol), a nitrile-containing cure site monomer (e.g. 8-CNVE) is the preferred cure site monomer. When the fluoroelastomer will be cured with ammonia or a compound that releases ammonia at curing temperatures (e.g. urea), a nitrile-containing cure site monomer (e.g. 8-CNVE) is the preferred cure site monomer.

Units of cure site monomer, when present in the fluoroelastomers manufactured by the process of this invention, are typically present at a level of 0.05-10 wt. % (based on the total weight of fluoroelastomer), preferably 0.05-5 wt. % and most preferably between 0.05 and 3 wt. %.

Specific fluoroelastomers which may be produced by the process of this invention include, but are not limited to those comprising copolymerized units of i) vinylidene fluoride and hexafluoropropylene; ii) vinylidene fluoride, hexafluoropropylene and tetrafluoroethylene; iii) vinylidene fluoride, hexafluoropropylene, tetrafluoroethylene and 4-bromo-3,3,4,4-tetrafluorobutene-1; iv) vinylidene fluoride, hexafluoropropylene, tetrafluoroethylene and 4-iodo-3,3,4,4-tetrafluorobutene-1; v) vinylidene fluoride, perfluoro(methyl vinyl) ether, tetrafluoroethylene and 4-bromo-3,3,4,4-tetrafluorobutene-1; vi) vinylidene fluoride, perfluoro(methyl vinyl)ether, tetrafluoroethylene and 4-iodo-3,3,4,4-tetrafluorobutene-1; vii) vinylidene fluoride, perfluoro(methyl vinyl) ether, tetrafluoroethylene and 1,1,3,3,3-pentafluoropropene; viii) tetrafluoroethylene, perfluoro(methyl vinyl)ether and ethylene; ix) tetrafluoroethylene, perfluoro(methyl vinyl) ether, ethylene and 4-bromo-3,3,4,4-tetrafluorobutene-1; x) tetrafluoroethylene, perfluoro(methyl vinyl)ether, ethylene and 4-iodo-3,3,4,4-tetrafluorobutene-1; xi) tetrafluoroethylene, propylene and vinylidene fluoride; xii) tetrafluoroethylene and perfluoro(methyl vinyl)ether; xiii) tetrafluoroethylene, perfluoro(methyl vinyl)ether and perfluoro(8-cyano-5-methyl-3,6-dioxa-1-octene); xiv) tetrafluoroethylene, perfluoro(methyl vinyl)ether and 4-bromo-3,3,4,4-tetrafluorobutene-1; xv) tetrafluoroethylene, perfluoro(methyl vinyl)

ether and 4-iodo-3,3,4,4-tetrafluorobutene-1; and xvi) tetrafluoroethylene, perfluoro(methyl vinyl)ether and perfluoro(2-phenoxypropyl vinyl)ether.

Additionally, iodine-containing endgroups, bromine-containing endgroups or mixtures thereof may optionally be present at one or both of the fluoroelastomer polymer chain ends as a result of the use of chain transfer or molecular weight regulating agents during preparation of the fluoroelastomers. The amount of chain transfer agent, when employed, is calculated to result in an iodine or bromine level in the fluoroelastomer in the range of 0.005-5 wt. %, preferably 0.05-3 wt. %.

Examples of chain transfer agents include iodine-containing compounds that result in incorporation of bound iodine at one or both ends of the polymer molecules. Methylene iodide; 1,4-diiodoperfluoro-n-butane; and 1,6-diiodo-3,3,4,4,tetrafluorohexane are representative of such agents. Other iodinated chain transfer agents include 1,3-diiodoperfluoropropane; 1,6-diiodoperfluorohexane; 1,3-diiodo-2-chloroperfluoropropane; 1,2-di(iododifluoromethyl)-perfluorocyclobutane; monoiodoperfluoroethane; monoiodoperfluorobutane; 2-iodo-1-hydroperfluoroethane, etc. Also included are the cyano-iodine chain transfer agents disclosed European Patent 0868447A1. Particularly preferred are diiodinated chain transfer agents.

Examples of brominated chain transfer agents include 1-bromo-2-iodoperfluoroethane; 1-bromo-3-iodoperfluoropropane; 1-iodo-2-bromo-1,1-difluoroethane and others such as disclosed in U.S. Pat. No. 5,151,492.

Other chain transfer agents suitable for use in the process of this invention include those disclosed in U.S. Pat. No. 3,707,529. Examples of such agents include isopropanol, diethylmalonate, ethyl acetate, carbon tetrachloride, acetone and dodecyl mercaptan.

Cure site monomers and chain transfer agents may be added to the reactor neat or as solutions. In addition to being introduced into the reactor near the beginning of polymerization, quantities of chain transfer agent may be added throughout the entire polymerization reaction period, depending upon the desired composition of the fluoroelastomer being produced, the chain transfer agent being employed, and the total reaction time.

The dispersing agent employed in the emulsion polymerization of this invention is a combination of at least two fluorosurfactants. At least one fluorosurfactant is a perfluoroaliphatic sulfinate. The sulfinate may have a formula $R_f$—$SO_2M$, where $R_f$ is a perfluoroalkyl group or a perfluoroalkoxy group. The sulfinate may also have the formula $R_f$—$(SO_2M)_n$ where $R_f$ is a polyvalent, preferably divalent, perfluoro radical and n is an integer from 2-4, preferably 2. Preferably the perfluoro radical is a perfluoroalkylene radical. Generally $R_f$ and $R_f$ have 1 to 20 carbon atoms, preferably 4 to 10 carbon atoms. M is a cation having a valence of 1 (e.g. $H^+$, $Na^+$, $K^+$, $NH_4^+$, etc.). Specific examples of such fluorosurfactants include, but are not limited to $C_4F_9$—$SO_2Na$; $C_6F_{13}$—$SO_2Na$; $C_8F_{17}$—$SO_2Na$; $C_6F_{12}$—$(SO_2Na)_2$; and $C_3F_7$—O—$CF_2CF_2$—$SO_2Na$.

At least one other fluorosurfactant is a perfluoropolyether (PFPE) having at least one endgroup selected from the group consisting of carboxylic acid, carboxylic acid salt, sulfonic acid and sulfonic acid salt. The perfluoropolyether used in this invention can have any chain structure in which oxygen atoms in the backbone of the molecule are separated by saturated fluorocarbon groups having 1-3 carbon atoms. More than one type of fluorocarbon group may be present in the molecule.

Representative structures have the repeat unit

  (XI)

  (XII)

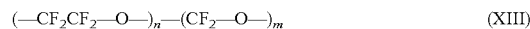  (XIII)

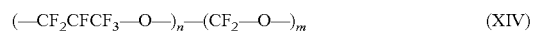  (XIV)

These structures are discussed by Kasai in J. Appl. Polymer Sci. 57, 797 (1995). As disclosed therein, such PFPE can have a carboxylic acid group or salt thereof ("carboxylic group") at one end or at both ends. Such structures are also possible with sulfonic groups at one end or at both ends. The "sulfonic" group may be present as the acid or as its ionic salt. In addition, PFPE with acid functionality at both ends may have a carboxylic group at one end and a sulfonic group at the other. The PFPE-sulfonic acids are produced by bubbling $SO_2$ through a solution of the corresponding potassium PFPE carboxylates in dimethylformamide at 140° C. following by extraction and conversion to the acid form by ion exchange. PFPE having structure XI is available from DuPont. PFPE having structure XII is available from Daikin. PFPE-XIII and XIV are available from Solvay Solexis. The PFPEs useful in the present invention are not limited to the particular PFPEs available from these companies. For monocarboxyl or monosulfonic PFPE, the other end of the molecule is usually perfluorinated but may contain a hydrogen or chlorine atom. PFPE having a carboxyl or sulfonic group at one or both ends that can be used in the present invention have at least 2 ether oxygens, more preferably at least 4 ether oxygens, and even more preferably at least 6 ether oxygens. Preferably, at least one of the fluorocarbon groups separating ether oxygens, and more preferably at least two of such fluorocarbon groups, has 2 or 3 carbon atoms. Even more preferably, at least 50% of the fluorocarbon groups separating ether oxygens has 2 or 3 carbon atoms. Also, preferably, the PFPE has a total of at least 9 carbon atoms, whereby the minimum value of n and n+m in the above repeat unit structures is at least 3. The molecular weight is low enough so that the PFPE is normally liquid at room temperature. While more than one PFPE having a carboxyl or sulfonic group at one or both ends can be used, normally only one such PFPE is employed.

The amount of total fluorosurfactant (i.e. amount of perfluoroaliphatic sulfinate, plus the amount of PFPE, plus any optional additional fluorosurfactant present) employed in the process of the invention is within typical ranges. Thus, the amount of total surfactant can be from about 0.01 wt. % to about 10 wt. %, preferably 0.05-3 wt. %, based on the total weight of water used in the polymerization. The concentration of surfactants that may be employed in the polymerization process of the present invention may be above or below the critical micelle concentration (c.m.c.) of each surfactant. The c.m.c. is different for different surfactants. As one skilled in the art will recognize, the amount of surfactant required to achieve a given level of dispersion stability will increase with the amount of polymer to be made at constant particle size. The amount of surfactant required for stability also increases with decreasing particle diameter at constant polymer made, since total surface area increases under these conditions. This is observed in some instances for the process of the present invention, which generally yields smaller dispersion particles than a similar process carried out in the absence of PFPE having carboxyl or sulfonic ends. In such instances, if total surfactant is not increased, the resultant dispersion can be unstable at room temperature and form a gel. However, the dispersions of this invention are still more stable at room temperature than would be expected from their total surfactant level and with their small dispersion particle size. Surprisingly, resultant dispersions that are unstable at room temperature appear to be stable at elevated temperatures used in polymerization, as judged by the small amount of coagulum in the reactor. "Coagulum" is non-water-wettable polymer that can separate from the aqueous dispersion during polymerization. The amount of coagulum formed is an indicator of dispersion stability.

While PFPE having carboxyl or sulfonic ends may be present in major amount in the dispersing agent, such compounds are costly. Of the total fluorosurfactant, PFPE having carboxyl or sulfonic end groups preferably is present in minor amount, i.e., less than half of total fluorosurfactant by weight. The amount of PFPE having carboxyl or sulfonic ends is more preferably no more than 25 wt. %, most preferably no more than 15 wt. %, based on weight of total fluorosurfactant. Generally, the amount of PFPE having carboxyl or sulfonic ends present is at least 1 wt. %, preferably at least 3 wt. %, based on the weight of total fluorosurfactant. The amount of PFPE having carboxyl or sulfonic endgroups that is used will depend on the level of effect (i.e., the particle size) desired. Surprisingly, the use of PFPE having carboxyl or sulfonic ends alone, e.g., in the absence of fluorosurfactant having at most one ether linkage (not polyether), does not yield improved results compared to the use of fluorosurfactant having at most one ether linkage alone. That is, the use of a combination of at least two fluorosurfactants, at least one of the fluorosurfactants being perfluoropolyether carboxylic acid or sulfonic acid or salt thereof and at least one of the fluorosurfactants being perfluoroalkyl or perfluoroalkoxy sulfinate provides a synergistic effect to the polymerization process, as compared to the use of either type of surfactant alone.

As used herein, "combination of fluorosurfactants" means that the components of the "combination" are present in the reactor during polymerization. The components can be introduced separately, including at different times, and need not be physically combined prior to introduction into the reactor, although they may be so combined. All of the fluorosurfactant may be added to the reactor before polymerization is begun or the addition can be split between a reactor precharge and a later addition, typically after most of the particle nucleation has occurred. The addition of the PFPE is preferably with the precharge.

The emulsion polymerization process of this invention may be a continuous, semi-batch or batch process.

In the semi-batch emulsion polymerization process of this invention, a gaseous monomer mixture of a desired composition (initial monomer charge) is introduced into a reactor which contains an aqueous medium precharge. The reactor is typically not completely filled with the aqueous medium, so that a vapor space remains. The aqueous medium comprises at least one fluorosurfactant dispersing agent of the types discussed above, i.e. a PFPE having a carboxyl or sulfonic endgroup, a perfluoroaliphatic sulfinate, and mixtures thereof. Optionally, the aqueous medium may contain a pH buffer, such as a phosphate or acetate buffer for controlling the pH of the polymerization reaction. Instead of a buffer, a base, such as NaOH may be used to control pH. Generally, pH is controlled to between 1 and 7 (preferably 3-7), depending upon the type of fluoroelastomer being made. Alternatively, or additionally, pH buffer or base may be added to the reactor at various times throughout the polymerization reaction, either alone or in combination with other ingredients such as polymerization initiator, liquid cure site monomer, chain transfer agent, or fluorosurfactant. If only one type fluorosurfactant is present in the reactor precharge, the other type fluorosurfactant is added during the reaction. Also optionally, the initial aqueous medium may contain a water-soluble inorganic peroxide polymerization initiator.

The initial monomer charge contains a quantity of a first fluoromonomer of either TFE or $VF_2$. If a thermoplastic copolymer or a fluoroelastomer is being made, the initial monomer charge also contains one or more additional monomers which are different from the first monomer. The amount of monomer mixture contained in the initial charge is set so as to result in a reactor pressure between 0.5 and 10 MPa.

The monomer mixture is dispersed in the aqueous medium and, optionally, a chain transfer agent may also be added at this point while the reaction mixture is agitated, typically by mechanical stirring. In the initial gaseous monomer charge, the relative amount of each monomer is dictated by reaction kinetics and is set so as to result in a fluoroelastomer having the desired ratio of copolymerized monomer units (i.e. very slow reacting monomers must be present in a higher amount relative to the other monomers than is desired in the composition of the fluoroelastomer to be produced).

The temperature of the semi-batch reaction mixture is maintained in the range of 25° C.-130° C., preferably 50° C.-100° C. Polymerization begins when the initiator either thermally decomposes or reacts with reducing agent and the resulting radicals react with dispersed monomer.

Additional quantities of the gaseous monomer(s) and optional cure site monomer (incremental feed) are added at a controlled rate throughout the polymerization in order to maintain a constant reactor pressure at a controlled temperature. The relative ratio of monomers contained in the incremental feed is set to be approximately the same as the desired ratio of copolymerized monomer units in the resulting fluoropolymer. In the case of fluoroelastomer production, the incremental feed contains between 25 to 70 weight percent, based on the total weight of the monomer mixture, of a first monomer of either TFE or $VF_2$ and 75 to 30 weight percent total of one or more additional monomers that are different from the first monomer. Chain transfer agent may also, optionally, be introduced into the reactor at any point during this stage of the polymerization. Additional fluorosurfactant(s) and polymerization initiator may also be fed to the reactor during this stage. The amount of polymer formed is approximately equal to the cumulative amount of incremental monomer feed. One skilled in the art will recognize that the molar ratio of monomers in the incremental feed is not necessarily exactly the same as that of the desired (i.e. selected) copolymerized monomer unit composition in the resulting fluoropolymer because the composition of the initial charge may not be exactly that required for the selected final fluoropolymer composition, or because a portion of the monomers in the incremental feed may dissolve into the polymer particles already formed, without reacting. Polymerization times in the range of from 2 to 30 hours are typically employed in this semi-batch polymerization process.

The continuous emulsion polymerization process of this invention differs from the semi-batch process in the following manner. The reactor is completely filled with aqueous medium so that there is no vapor space. Gaseous monomers and solutions of other ingredients such as water-soluble monomers, chain transfer agents, buffer, bases, polymerization initiator, surfactant, etc., are fed to the reactor in separate streams at a constant rate. Feed rates are controlled so that the average polymer residence time in the reactor is generally between 0.2 to 4 hours. Short residence times are employed for reactive monomers, whereas less reactive monomers such as perfluoro(alkyl vinyl)ethers require more time. The temperature of the continuous process reaction mixture is maintained in the range of 25° C.-130° C., preferably 70° C.-120° C.

In the process of this invention, the polymerization temperature is maintained in the range of 25° C.-130° C. If the temperature is below 25° C., the rate of polymerization is too slow for efficient reaction on a commercial scale, while if the temperature is above 130° C., the reactor pressure required in order to maintain polymerization is too high to be practical.

The polymerization pressure is controlled in the range of 0.5 to 10 MPa, preferably 1 to 6.2 MPa. In a semi-batch process, the desired polymerization pressure is initially achieved by adjusting the amount of gaseous monomers in the initial charge, and after the reaction is initiated, the pressure is adjusted by controlling the incremental gaseous monomer feed. In a continuous process, pressure is adjusted by means of a back-pressure regulator in the dispersion effluent line. The polymerization pressure is set in the above range because if it is below 1 MPa, the monomer concentration in the polymerization reaction system is too low to obtain a satisfactory reaction rate. In addition, the molecular weight does not increase sufficiently. If the pressure is above 10 MPa, the cost of the required high pressure equipment is very high.

The amount of fluoropolymer formed is approximately equal to the amount of incremental feed charged, and is in the range of 10-30 parts by weight of fluoropolymer per 100 parts by weight of aqueous medium, preferably in the range of 20-25 parts by weight of the fluoropolymer. The degree of fluoropolymer formation is set in the above range because if it is less than 10 parts by weight, productivity is undesirably low, while if it is above 30 parts by weight, the solids content becomes too high for satisfactory stirring.

Water-soluble peroxides which may be used to initiate polymerization in this invention include, for example, the ammonium, sodium or potassium salts of hydrogen persulfate. In a redox-type initiation, a reducing agent such as sodium sulfite, is present in addition to the peroxide. These water-soluble peroxides may be used alone or as a mixture of two or more types. The amount to be used is selected generally in the range of 0.01 to 0.4 parts by weight per 100 parts by weight of polymer, preferably 0.05 to 0.3. During polymerization some of the fluoroelastomer polymer chain ends are capped with fragments generated by the decomposition of these peroxides.

Optionally, fluoropolymer gum or crumb may be isolated from the fluoropolymer dispersions produced by the process of this invention by the addition of a coagulating agent to the dispersion. Any coagulating agent known in the art may be used. Preferably, a coagulating agent is chosen which forms a water-soluble salt with the surfactant contained in the dispersion. Otherwise, precipitated surfactant salt may become entrained in the isolated fluoroelastomer and then retard curing of the fluoroelastomer with bisphenol-type curatives.

Common coagulants include, but are not limited to aluminum salts (e.g. potassium aluminum sulfate), calcium salts (e.g. calcium nitrate) or magnesium salts (e.g. magnesium sulfate). Salts of calcium, magnesium, or univalent cations with such short chain surfactants are water-soluble, and thus readily removable from the fluoroelastomer.

The fluoropolymers prepared by the process of this invention are useful in many industrial applications including seals, wire coatings, tubing and laminates.

EXAMPLES

Test Methods

Mooney viscosity, ML (1+10), was determined according to ASTM D1646 with an L (large) type rotor at 149° C., using a preheating time of one minute and rotor operation time of 10 minutes.

The invention is further illustrated by, but is not limited to, the following examples.

Perfluoroaliphatic sulfinates suitable for use in the emulsion polymerization process of this invention were prepared by the following procedure.

Preparation of Perfluorooctyl Sulfinate [$C_8F_{17}$—$SO_2Na$]:

A 1-L three neck flask equipped with temperature probe, mechanical stirrer and a condenser was left under nitrogen stream overnight. The flask was charged with 1-idoperfluorooctane (136.5 g, 0.25 mol) followed by sodium bicarbonate (21 g, 0.25 mol). The mixture was stirred for 5 min before adding deoxygenated distilled water (100 mL). While stirring with a mechanical stirrer, sodium dithionite (52.25 g) was added slowly over a period of 30-40 minutes. The mixture foamed and the temperature rose to about 32° C. After addition of all the sodium dithionite, acetonitrile (75 mL) was introduced. Foam formation and some heat generation was again observed. The reaction mixture was allowed to stir at ambient temperature overnight and then was heated to 75° C. for an additional 3 hrs. The reaction mixture was cooled and filtered. The filtered solid (about 134 grams) was dissolved in approximately 700 mL of acetone. Several scoops of carbon black were added and the solution was stirred for several hours. After concentration (i.e. removal of solvent on a rotary evaporator) at room temperature and filtration, about 69 g of white solid product was recovered. The filtrate from the reaction mixture was further concentrated to give about 62 grams of material which was treated similarly with acetone and carbon black. After drying, a additional 41 of product was obtained. Total yield was about 86%. $^{19}$F-NMR (376.89 MHz, acetone-$d_6$): −82.1 (m, 3F), −122.9 (m, 6F), −123.6 (s, br, 4F), −127.1 (s, 2F), −132.7 (s, 2F).

Preparation of Perfluorohexyl Sulfinate [$C_6F_{13}$—$SO_2Na$]:

To a round-bottom flask equipped with a mechanical stirrer, condenser and a temperature probe, under a stream of nitrogen was added 1-iodoperfluorohexane (100 g, 0.22 mol), sodium bicarbonate (18.8 g, 0.22 mol), and deoxygenated distilled water (93 mL). While stirring, sodium dithionite (46.1 g, 0.26 mol) was slowly added. The reaction mixture foamed, evolving heat that raised the temperature to about 32° C. The reaction solution started to become yellowish. After addition of all the sodium dithionite, acetonitrile (72 mL) was then added. The reaction mixture was heated to 70°-75° C. for 4-5 hours, and the reaction mixture turned to deeper yellow color. After cooling, the reaction mixture was filtered and collected solid was dissolved in ethyl acetate. The organic solution was separated and washed twice with deoxygenated water in a separatory funnel. The solution was concentrated on a rotary evaporator and further dried under high vacuum. The desired product was obtained as a white solid (83 grams, 91.2% yield). $^{19}$F-NMR (376.89 MHz, acetone-$d_6$): −82.2 (m, 3F), −123.2 (m, 2F), −123.7 (m, 2F), −124.0 (m, 2F), −127.2 (s, 2F), −132.6 (s, 2F).

Other perfluoroalkyl and perfluoroalkoxy sulfinates were prepared by the similar procedures.

Perfluorobutyl Sulfinate [$C_4F_9$—$SO_2Na$]:
$^{19}$F-NMR (376.89 MHz, acetone-$d_6$): −82.5 (m, 3F), −124.5 (m, 2F), −127.5 (m, 2F), −131.4 (s, br, 2F).

1,6-Perfluorohexyl Disulfinate [$C_6F_{12}$—$(SO_2Na_2)$]:
$^{19}$F-NMR (376.89 MHz, $D_2O$): −122.5 (m, 4F), −122.8 (m, 4F), −130.3 (m, 4F).

3-Oxa-Perfluorohexyl Sulfinate [$C_3F_7$—O—$CF_2CF_2$—$SO_2Na$]:
$^{19}$F-NMR (376.89 MHz, acetone-$d_6$): −83.5 (m, 3F), −83.8 to −85.3 (m, 4F), −131.1 (s, br, 2F), −135.7 (s, br, 2F).

Example 1

A perfluoroelastomer containing copolymerized monomers of tetrafluoroethylene (TFE), perfluoro(methyl vinyl ether) (PMVE), and perfluoro-8(cyano-5-methyl-3,6-dioxa-1-octene) (8CNVE) in a molar ratio of approximately 67.2/32.1/0.7 was prepared as follows: three aqueous streams were each fed continuously to a 1 liter mechanically stirred, water jacketed, stainless steel autoclave at a rate of 81 cm$^3$/hour (hr). The first stream consisted of 13.4 g ammonium persulfate and 188.7 g of disodium hydrogen phosphate in 3 liters of deionized water. The two other streams each consisted of 45 g of perfluoro-n-hexyl sulfinate and 6.75 g of Krytox® 157 FSL oil (available from DuPont) in 3 liters of deionized water. Using a diaphragm compressor, a mixture of TFE (59.6 g/hr) and PMVE (66.7 g/hr) was fed at constant rate. The temperature was maintained at 85° C., the pressure at 4.1 MPa (600 psi), and the pH at 7.2 throughout the reaction. The polymer emulsion was removed continuously by means of a letdown valve and the unreacted monomers were vented. The polymer was isolated from the emulsion by first diluting it with deionized water at the rate of 8 liters deionized water per liter of emulsion, followed by addition of 320 cm$^3$ of a magnesium sulfate solution (100 g magnesium sulfate heptahydrate per liter of deionized water) per liter of emulsion at a temperature of 60° C. The resulting slurry was filtered. The polymer solids obtained from a liter of emulsion were re-dispersed in 8 liters of deionized water at 60° C. After filtering, the wet crumb was dried in a forced air oven for 48 hr at 70° C. Polymer yield was 76 g per hour of reactor operation. The polymer composition was 43.6 wt. % PMVE, 1.84 wt. % 8CNVE, the remainder being tetrafluoroethylene. The polymer had an inherent viscosity of 0.52 measured in a solution of 0.1 g polymer in 100 g of Flutec® PP-11 (F2 Chemicals Ltd., Preston, UK) at 30° C.

What is claimed is:

1. An emulsion polymerization process for the production of fluoropolymers, said process comprising polymerizing at least one fluoromonomer in an aqueous medium comprising initiator and dispersing agent to obtain an aqueous dispersion of fluoropolymer, wherein said dispersing agent is a combination of at least two fluorosurfactants, at least one of said fluorosurfactants is perfluoroaliphatic sulfinate, and at least one of said fluorosurfactants is a perfluoropolyether having at least one endgroup selected from the group consisting of carboxylic acid, carboxylic acid salt, sulfonic acid and sulfonic acid salt.

2. The process of claim 1 wherein said perfluoroaliphatic sulfinate is of the formula $R_f$—$SO_2M$, where $R_f$ is a perfluoroalkyl group or a perfluoroalkoxy group containing 1 to 20 carbon atoms and M is a cation having a valence of 1.

3. The process of claim 2 wherein said $R_f$ is a perfluoroalkyl group or a perfluoroalkoxy group containing 4 to 10 carbon atoms.

4. The process claim 3 wherein said perfluoroaliphatic sulfinate is of the formula $C_4F_9$—$SO_2Na$; $C_6F_{13}$—$SO_2Na$; $C_8F_{17}$—$SO_2Na$; and $C_3F_7$—O—$CF_2CF_2$—$SO_2Na$.

5. The process of claim 1 wherein said perfluoroaliphatic sulfinate is of the formula $R_f$—$(SO_2M)_n$ where $R_f$ is a polyvalent perfluoro radical containing 1 to 20 carbon atoms, M is a cation having a valence of 1 and n is an integer from 2-4.

6. The process of claim 5 wherein $R_f$ is a perfluoroalkylene radical containing 4 to 10 carbon atoms.

7. The process of claim 6 wherein said perfluoroaliphatic sulfinate is of the formula $C_6F_{12}$—$(SO_2Na)_2$.

8. The process of claim 1 wherein said perfluoropolyether is present in an amount no more than 25 wt. % of said dispersing agent.

9. The process of claim 8 wherein said perfluoropolyether is present in an amount between 1 wt. % and 15 wt. % of said dispersing agent.

10. The process of claim 1 wherein said fluoropolymer is a fluoroelastomer.

11. The process of claim 1 wherein said fluoropolymer is a thermoplastic fluoropolymer.

12. The process of claim 1 wherein said at least one fluoromonomer is selected from the group consisting of fluorine-containing olefins and fluorine-containing vinyl ethers.

13. The process of claim 12 wherein said fluorine-containing olefin is selected from the group consisting of vinylidene fluoride, hexafluoropropylene, tetrafluoroethylene, 1,2,3,3,3-pentafluoropropene, 1,1,3,3,3-pentafluoropropene, chlorotrifluoroethylene and vinyl fluoride.

14. The process of claim 12 wherein said fluorine-containing vinyl ether is a perfluoro(alkyl vinyl ether).

15. The process of claim 1 wherein said fluoropolymer is a fluoroelastomer and said at least one fluoromonomer is selected from the group consisting of vinylidene fluoride and tetrafluoroethylene.

16. The process of claim 15 wherein said fluoroelastomer is a polymer comprising copolymerized units selected from the group consisting of i) vinylidene fluoride and hexafluoropropylene; ii) vinylidene fluoride, hexafluoropropylene and tetrafluoroethylene; iii) vinylidene fluoride, hexafluoropropylene, tetrafluoroethylene and 4-bromo-3,3,4,4-tetrafluorobutene-1; iv) vinylidene fluoride, hexafluoropropylene, tetrafluoroethylene and 4-iodo-3,3,4,4-tetrafluorobutene-1; v) vinylidene fluoride, perfluoro(methyl vinyl)ether, tetrafluoroethylene and 4-bromo-3,3,4,4-tetrafluorobutene-1; vi) vinylidene fluoride, perfluoro(methyl vinyl) ether, tetrafluoroethylene and 4-iodo-3,3,4,4-tetrafluorobutene-1; vii) vinylidene fluoride, perfluoro(methyl vinyl) ether, tetrafluoroethylene and 1,1,3,3,3-pentafluoropropene; viii) tetrafluoroethylene, perfluoro(methyl vinyl)ether and ethylene; ix) tetrafluoroethylene, perfluoro(methyl vinyl) ether, ethylene and 4-bromo-3,3,4,4-tetrafluorobutene-1; x) tetrafluoroethylene, perfluoro(methyl vinyl)ether, ethylene and 4-iodo-3,3,4,4-tetrafluorobutene-1; xi) tetrafluoroethylene, propylene and vinylidene fluoride; xii) tetrafluoroethylene and perfluoro(methyl vinyl)ether; xiii) tetrafluoroethylene, perfluoro(methyl vinyl)ether and perfluoro(8-cyano-5-methyl-3,6-dioxa-1-octene); xiv) tetrafluoroethylene, perfluoro(methyl vinyl)ether and 4-bromo-3,3,4,4-tetrafluorobutene-1; xv) tetrafluoroethylene, perfluoro(methyl vinyl) ether and 4-iodo-3,3,4,4-tetrafluorobutene-1; and xvi) tetrafluoroethylene, perfluoro(methyl vinyl)ether and perfluoro (2-phenoxypropyl vinyl)ether.

* * * * *

UNITED STATES PATENT AND TRADEMARK OFFICE
CERTIFICATE OF CORRECTION

PATENT NO. : 7,754,810 B2
APPLICATION NO. : 12/255082
DATED : July 13, 2010
INVENTOR(S) : Michael Cregg Coughlin, Ming-Hong Hung and Phan Linh Tang Page 1 of 1

It is certified that error appears in the above-identified patent and that said Letters Patent is hereby corrected as shown below:

On title page, please add the following:

-- Assignee:   DuPont Performance Elastomers L.L.C.
                Wilmington, Delaware USA --

Signed and Sealed this
Seventh Day of June, 2011

David J. Kappos
*Director of the United States Patent and Trademark Office*